(12) United States Patent
Mallapragada et al.

(10) Patent No.: US 7,160,971 B2
(45) Date of Patent: Jan. 9, 2007

(54) PH-SENSITIVE METHACRYLIC COPOLYMERS AND THE PRODUCTION THEREOF

(75) Inventors: Surya K. Mallapragada, Ames, IA (US); Brian C. Anderson, Lake Bluff, IL (US); Paul D. Bloom, Decatur, IL (US); Valerie V. Sheares Ashby, Ankeny, IA (US)

(73) Assignee: Iowa State University Research Foundation, Ames, IA (US)

( * ) Notice: Subject to any disclaimer, the term of this patent is extended or adjusted under 35 U.S.C. 154(b) by 0 days.

(21) Appl. No.: 11/284,502

(22) Filed: Nov. 22, 2005

(65) Prior Publication Data

US 2006/0084774 A1    Apr. 20, 2006

Related U.S. Application Data

(63) Continuation of application No. 10/367,415, filed on Feb. 14, 2003, now Pat. No. 6,998,456.

(60) Provisional application No. 60/357,499, filed on Feb. 15, 2002.

(51) Int. Cl.
     *C08F 218/00*    (2006.01)

(52) U.S. Cl. ................ 526/307.7; 526/217; 526/219.6; 526/234; 526/264; 526/288; 526/291; 526/303.1; 526/304; 526/307.3; 526/317.1; 526/328.5; 526/347.1

(58) Field of Classification Search ................ 526/277, 526/279, 310, 317.1, 328.5, 332, 333, 217, 526/219.6, 234, 263, 288, 291, 303.1, 304, 526/307.3, 307.7, 347.1
See application file for complete search history.

(56) References Cited

U.S. PATENT DOCUMENTS

| | | | |
|---|---|---|---|
| 2,959,565 A * | 11/1960 | Traylor et al. | 525/426 |
| 4,060,678 A | 11/1977 | Steckler | |
| 5,407,581 A | 4/1995 | Onodera et al. | |
| 2004/0127391 A1* | 7/2004 | Claesson et al. | 510/475 |

OTHER PUBLICATIONS

Anderson et al. Synthesis and characterization of water-soluble block copolymers for pH-sensitive delivery, 2001, Materials Research Society Symposium Proceedings, 662 (Biomaterials for Drug Delivery and Tissue Engineering), NN1.8-NN1.8/6.*
Deshpande, et al., Macromolecules 32(6), 2088-2090, 1999.
Hariharan, et al., Polymer, 37(1), 149-161, 1996.

* cited by examiner

*Primary Examiner*—David W. Wu
*Assistant Examiner*—M. Bernshteyn
(74) *Attorney, Agent, or Firm*—Quarles & Brady, LLP

(57) ABSTRACT

The present invention provides novel multi-functional methacrylic copolymers that exhibit cationic pH-sensitive behavior as well as good water solubility under acidic conditions. The copolymers are constructed from tertiary amine methacrylates and poly(ethylene glycol) containing methacrylates. The copolymers are useful as gene vectors, pharmaceutical carriers, and in protein separation applications.

20 Claims, 8 Drawing Sheets

(a)  (b)

(c)  (d)

PH-SENSITIVE METHACRYLIC COPOLYMERS AND THE PRODUCTION THEREOF

CROSS-REFERENCE TO RELATED APPLICATIONS

This application is a continuation of U.S. patent application Ser. No. 10/367,415, filed on Feb. 14, 2003, now U.S. Pat. No. 6,998,456 which claims priority to U.S. Provisional Patent Application Ser. No. 60/357,499, filed on Feb. 15, 2002.

STATEMENT REGARDING FEDERALLY SPONSORED RESEARCH OR DEVELOPMENT

The present inventions were developed using funds provided by the U.S. Department of Energy under contract number W-7405-ENG-82. The U.S. Government has certain rights in and to the present inventions.

BACKGROUND OF THE INVENTION

The present invention relates generally to copolymers useful in applications such as drug delivery, protein separation, and gene vectors. The copolymers are water soluble and pH-sensitive under acidic conditions.

One beneficial characteristic that polymeric materials have added to the field of drug delivery is their ability to respond to their environment. By modifying the chemical composition of either the backbone or pendant groups, polymers can respond to a wide range of stimuli. One stimuli more often exploited for drug delivery purposes is pH dependence. This dependence can be expressed by polymers having either anionic or cationic characteristics. Polymers with cationic functionality will tend to swell in low pH aqueous solutions whereas polymers with anionic functionality tend to swell in high pH solutions.

Cross linked cationic polymer membranes of diethylaminoethyl methacrylate (DEAEM) and dimethylaminoethyl methacrylate (DMAEM) have been previously synthesized for drug delivery applications. (See G. Albin et al., *J. Controlled Rel.*, 2:153 (1985); J. Kost et al., *J. Biomed. Mater. Res.*, 19:1117 (1985); K. Ishihara et al., *Polymer J.*, 16(8):625 (1984); D. Hariharan and N. A. Peppas, *Polymer.*, 37(1):149 (1996); and L. M. Schwarte and N. A. Peppas, *Polymer.*, 39(24)L6057 (1998).) In these cases, the polymers have been rendered glucose sensitive by the attachment of glucose oxidase, thus providing a possible vehicle for insulin release. One main disadvantage of these materials, however, is that they are not water-soluble and, if implanted, remain in the body long after the useful life of the delivery device.

Other research efforts have focused on graft and block copolymers comprised of domains with anionic functionality and separate water-soluble portions, such as poly(ethylene glycol) (PEG). (See A. S. Hoffman et al., *Polym. Prepr.*, 38(1):524 (1997); L. Bromberg, *Ind. Eng. Chem. Res.*, 37:4267 (1998); and L. Bromberg, *J. Phys. Chem.*, 102:1956 (1998).) These polymers have been primarily used for the release of drugs in the intestines, where a rise in pH would indicate that the device had passed through the stomach and is no longer in the harsh acidic conditions. Once in the intestines, where the pH is higher, the delivery polymer then becomes water-soluble and the polymer-bound drug may be released.

Nagasaki et al. also reported the production of various methacrylic block polymers with possible use in drug delivery applications. (Nagasaki et al., *Macromol. Rapid. Commun.*, 18:827 (1997).) These block polymers are prepared by polymerizing a methacrylic ester monomer, having an electron-donating substituent group bonded to a specific site of its ester residue, using a potassium alcoholate. Under this polymerization system, if a cyclic ether (e.g., ethylene oxide) or a cyclic ester (e.g., a lactide or lactone) is reacted with the methacrylic ester monomer, a living polymer chain could be produced with the methacrylic ester extending through the medium of the living polymer chain. If the cyclic ether or cyclic ester is allowed to coexist in the reaction system, the monomer may also readily undergo co-polymerization to yield a block copolymer of a methacrylic ester possessing both a functional group at the ester sides and a lactide or lactone.

Other polymers, such as polyethyleneimine, have been used as vehicles to induce flocculation of proteins and other biomacromolecules. (See Mortimer, D. A., *Polymer Inter.*, 25:29 (1991); and Chen et al., *Chem. Eng. Sci.*, 47:1039 (1992).) In these polymers, the electrostatic interaction between the biomolecule and the selected polyelectrolyte provides the means to selectively precipitate charged molecules out of an aqueous solution, such as a fermentation broth.

The newest use for cationic polymers is the delivery of genetic material to mammalian cells for gene therapy applications. Recently van de Wetering et al. outlined the use of tertiary amine methacrylate homopolymers for gene delivery and the effect that the type of methacrylate has on the transfection efficiency. (See van de Wettering et al., *J. Controlled Release*, 64:193 (2000).) It was found in this study that a homopolymer of 2-(diethylamino)ethyl methacrylate (DEAEM) might be a useful delivery material for plasmid DNA. However, it was also found that DEAEM could not form polymer/DNA complexes like many other cationic methacrylates, presumably because of the low water solubility of the polymer.

Rungsardthong et al., also recently reported the use of copolymers for gene delivery applications. (Rungsardthong et al., *J. Controlled Release*, 73:359–380 (2001).) In this study copolymers of DMAEMA with poly(ethylene) glycol (PEG) were investigated for their ability to serve as vectors in gene therapy. In vitro transfection experiments in this study showed that the DMAEMA homopolymer gave the highest level of transfection as compared to the control poly-L-lysine (PLL) system. The PEG:DMAEMA copolymer gave reduced levels of transfection, believed to be due to the steric stabilization effect of the PEG corona.

BRIEF SUMMARY OF THE INVENTION

The present invention is summarized as a group of novel copolymers that are water soluble and pH-sensitive. The copolymers are described in detail below and may be prepared by anionic polymerization of a tertiary amine methacrylate with a poly(ethylene glycol) containing methacrylate. The copolymers include a hydrophilic and a hydrophobic segment, are non-cytotoxic, and exhibit cationic pH-sensitive behavior and good water solubility.

The copolymers of the present invention may find use in several types of applications as a result of their unique physically properties. For example, in one embodiment, the copolymers may be associated with certain genetic material so as to provide a genetic transformation vector. The copolymers may also be associated with materials such as proteins and pharmaceuticals for drug delivery or protein separation. As a result, the present invention includes gene vectors, pharmaceuticals and protein separation reagents including the copolymers of the present invention.

One advantage of the present copolymers is that they are pH-sensitive and able to control the release of associated materials based on the pH of the surrounding environment.

Another advantage of the present copolymers is that they are non-cytotoxic and may therefore find use in applications involving living tissues.

Other advantages and features of the present invention will become apparent after review of the specification, drawings, and claims.

DETAILED DESCRIPTION OF THE INVENTION

We have developed novel multi-functional methacrylic copolymers that exhibit cationic pH-sensitive behavior as well as good water solubility. The copolymers are constructed from tertiary amine methacrylates and poly(ethylene glycol) containing methacrylates. The novel copolymers are represented by the following formula (I):

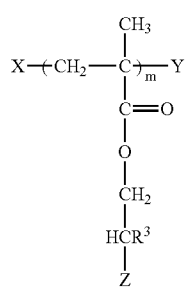

(I)

wherein X and Y are represented by the following group (a), unless X is an endcap, then X is represented by L-O wherein L is an organic group, or if Y is an endcap, then Y is a reactive or unreactive terminator group:

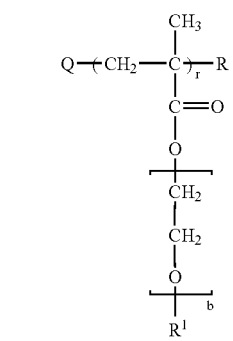

(a)

wherein r of group (a) for each group X and Y are independent values from each other, and wherein Q and R are a group represented by formula (I) in which m for each group Q and R are independent values from each other, but if R is an endcap, then R is a reactive or unreactive terminator group, or if Q is an endcap, then Q is represented by L-O wherein L is an organic group;

$R^1$ is either protected or unprotected and is either an amine, a hydrogen, $CH_3$, a carboxylic acid, a linked biomolecule or linked bioactive molecule;

r is an integer in the range of 0 to 5,000; and b is an integer in the range of either 1 to 50, 1 to 25, or 1 to 6;

$R^3$ is a hydrogen or a $C_{1-6}$ alkyl group;

Z is selected from the group of $NR^6R^7$, $P(OR^8)_3$, $SR^9$, SH,

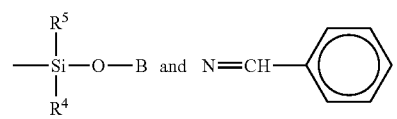

in which $R^6$, $R^7$, and $R^3$ are the same or different $C_{1-6}$ alkyl groups, $R^9$ is a tri($C_{1-6}$ alkyl)silyl group, and B is a $C_{1-6}$ alkyl group; and m is a positive number of 1 to 5,000.

Figure 1:
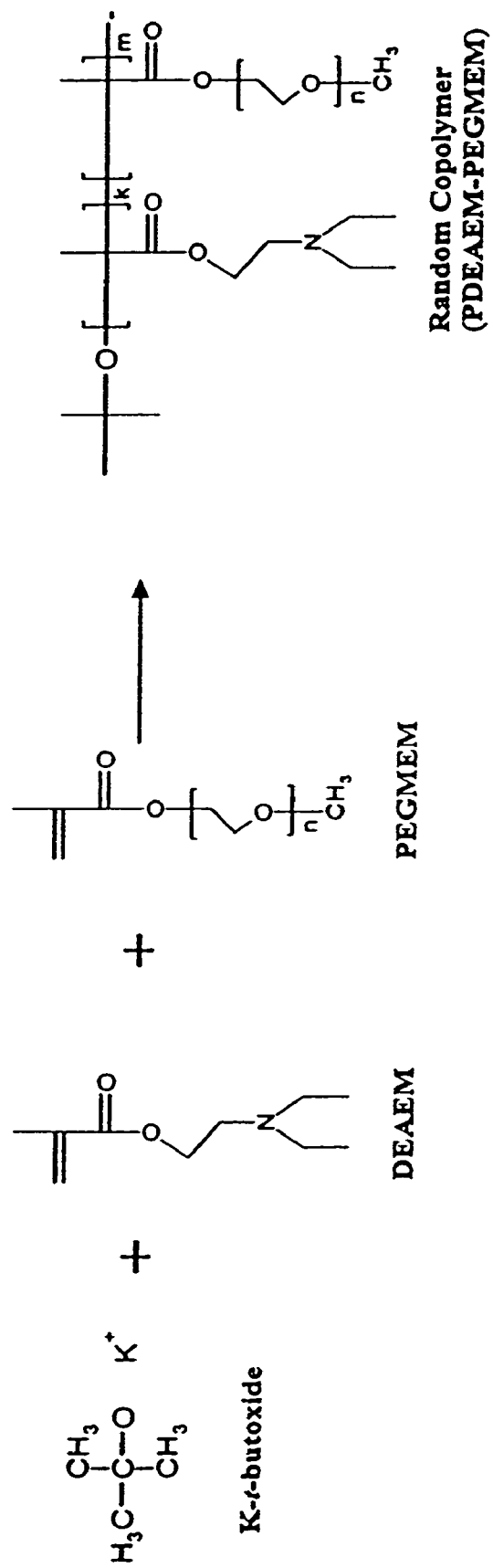
FIG. 1 is an illustration of the reaction scheme for the copolymers of the present invention.
Figure 2:
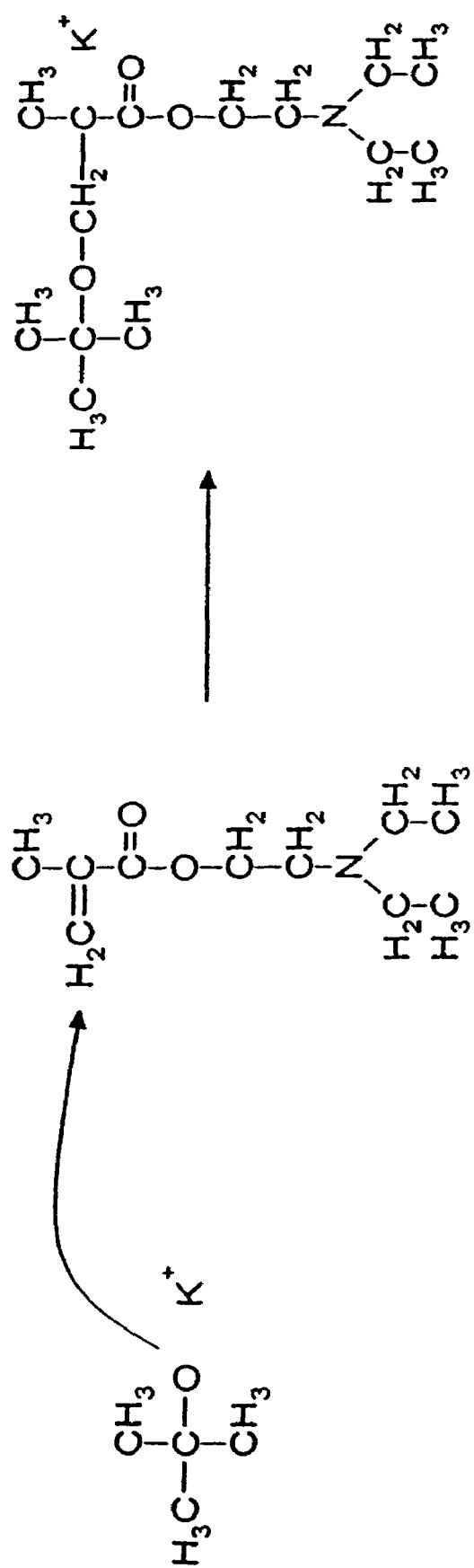
FIG. 2 is an illustration of the reaction scheme for the initiation of the DEAEM monomer.

As illustrated in FIGS. 1 and 2, the copolymers may be synthesized by anionic polymerization of a poly(ethylene glycol) containing methacrylate having the following formula (II):

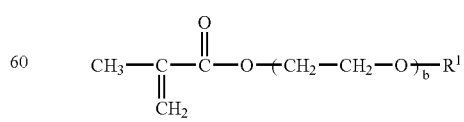

(II)

wherein R1 and b are as defined for group (a) of formula (I), with a tertiary amine methacrylate having the following formula (III):

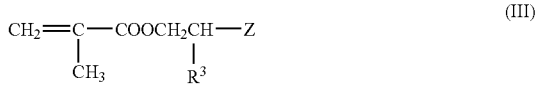

(III)

wherein R³ and Z are as defined for formula (I).

The tertiary amine methacrylate of formula (III) above may include any tertiary amine methacrylate known in the art, including low molecular weight or high molecular weight varieties of said compounds. Preferably $R^3$ is a hydrogen. In the most preferred embodiment, the tertiary amine methacrylate is 2-(N,N-diethylaminoethyl methacrylate).

The poly(ethylene glycol) containing methacrylate represented by formula (II) above may include any poly(ethylene glycol) containing methacrylate known in the art, including low molecular weight or high molecular weight variations thereof. The selected poly(ethylene glycol) containing methacrylate may also be either substituted or unsubstituted. The group may also be a residue obtained by using its alkali metal alcoholate as a living anionic polymerization initiator to effect a living polymerization. In the most preferred embodiment, the poly(ethylene glycol) containing methacrylate is poly(ethylene glycol) methyl ether methacrylate (PEGMEM).

The group $R^1$ of group (a) of formula (I) will generally be either a protected or unprotected amine, hydrogen, carboxylic acid, or a linked biomolecule or bioactive molecule. Carboxylic acids preferably include $CH_2$—$CH_2$—COOH and $CH_2$—COOH, but may also include any other protected carboxylic acid known in the art which does not interfere with the polymerization of the copolymers of the present invention. Bioactive molecules and biomolecules capable of being linked to the compounds represented by formula (II) may also be employed in practicing the present invention. Such bioactive molecules and biomolecules may include, without limitation, transferrin, folic acid, glycoconjugates, epidermal growth factor (EGF), and vascular endothelial growth factor (VEGF), and may be linked to the compound of formula (II) using any method known in the art. For example, the biomolecule or bioactive molecule may be linked to the compound using a carbodiimide coupling mechanism, such as dicyclocarbodiimide (DDC) or 1-Ethyl-3-(3-dimethylaminopropyl)-carbodiimide (EDC) or by attaching to a side chain having $R^1$ represented by $CH_2$—$CONHR^2$, wherein $R^2$ is the biomolecule or bioactive molecule.

If $R^1$ in formula (II) above is a proton donor group, such as COOH for example, the molecule must be protected before synthesis and de-protected before use. Methods for protecting and de-protecting proton donor groups are commonly known in the art, as well as compounds which may be used as protecting groups. One such compound may include T-butyl carbamate.

The copolymers of the present invention are preferably synthesized using anionic polymerization, but may also be prepared using any technique that results in the synthesis of compounds having the above described formula (I). One such method is described by Nagasaki et al. in European Patent No. EP 0976767A1, which is incorporated herein by reference.

In the preferred embodiment, the copolymers of the present invention are prepared by reacting a polymerization initiator with the poly(ethylene) glycol containing methacrylate of formula (II) above and a tertiary amine methacrylate of formula (III), or any compound that results in the compound of formula (II) or (III) as long as the compound utilized assumes a structure capable of forming a complex with the alkali metal of the polymerization initiator, and specifically a compound that keeps a definite intermolecular distance from the oxygen atom to which $CHR^3Z$ is bonded and exhibits electron donating properties. (See FIG. 2.) The polymerization initiator is generally an alcoholate represented by the following formula (IV):

(IV)

wherein L is an organic group as defined for formula (II) and M is an alkali metal, such as sodium or potassium. The initiator may be prepared according to any method known in the art. For example, the initiator may be prepared by reacting a hydroxy compound containing the group L with an alkali metal hydride, alkali metal alkyl or aryl, alkali metal, alkali metal amide or the like.

The polymerization reaction may be carried out with or without the presence of an inert solvent, but preferably includes the use of an inert solvent. As used herein, the term "inert solvent" means any solvent that neither reacts with nor exerts an adverse influence on the polymerization reaction or the initiator and the formed polymer. Examples of such solvents include liquid solvents that do not react with alkali metal alcoholates under reaction conditions, including ether solvents, such as tetrahydrofuran, dioxane, diethyl ether and dimethoxyethane; aprotic solvents such as dimethyl sulfoxide, N,N-dimethylformamide, N,N-dimethylacetamide, and hexamethylphosphoric triamide; aliphatic hydrocarbons such as pentane, hexane and cyclohexane; and aromatic hydrocarbons such as benzene, toluene and xylene, with ethers such as tetrahydrofuran most preferred.

The amount of inert solvent employed, if any, will generally determine the speed at which the reaction will occur. In general, the reaction will be slower as the relative amount of the solvent increase. Therefore, the solvent is preferably used in an amount of 0.01 to 1,000 parts by volume of solvent to volume of monomer, and more preferably 0.5 to 100 parts by volume of solvent to volume of monomer.

In general, the compound of formula (II) may be used in a molar ratio of 0.0001 to 100 moles per mole of the formula (III) compound, and more preferably 0.0001 mole to 1 mole per mole of the formula (III) compound.

Figure 8:
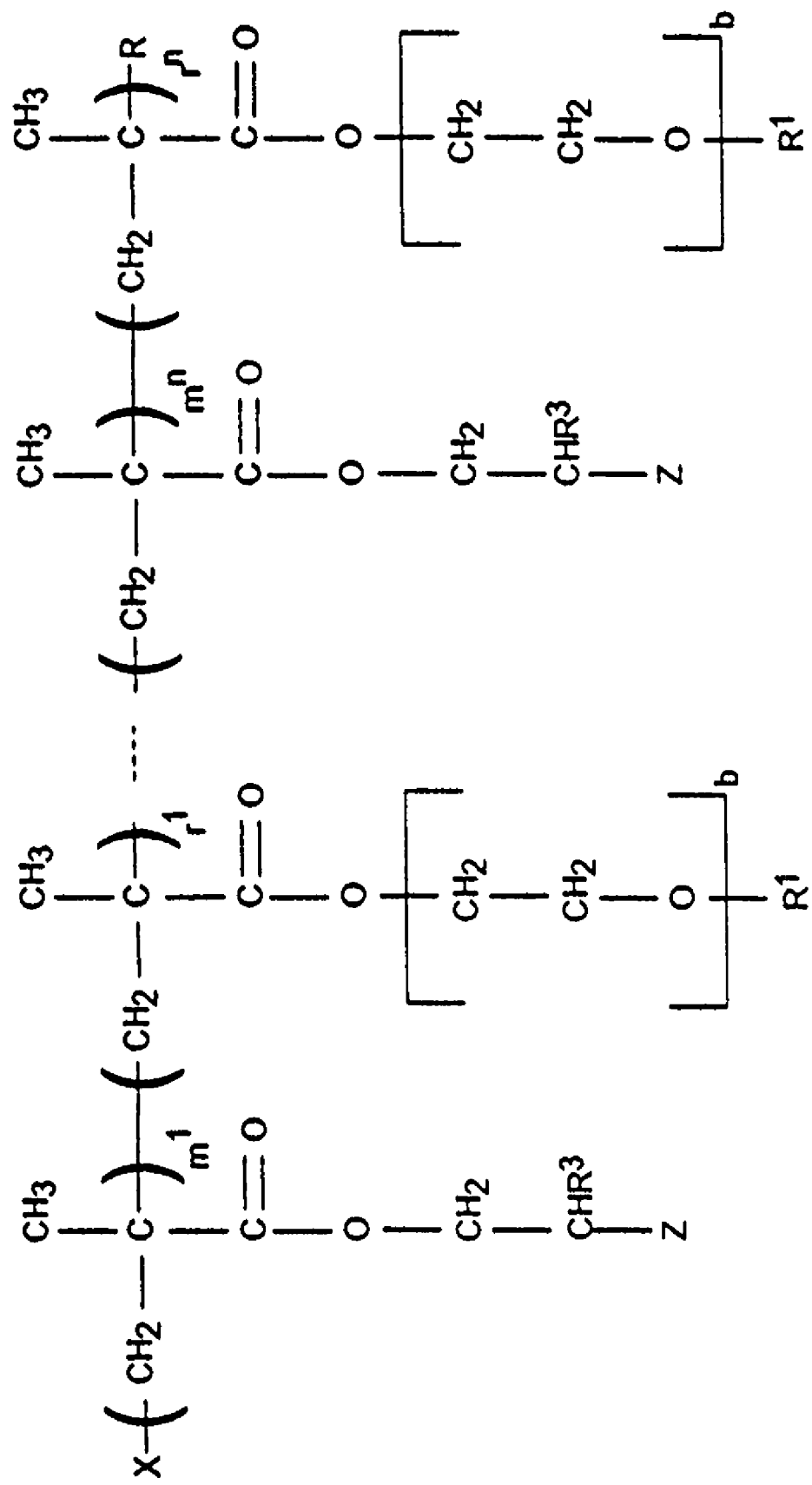
FIG. 8 is a general illustration of one copolymer of the present invention.

FIG. 8 generally illustrates one embodiment of the present invention. In FIG. 8, group X serves as one endcap and will generally be represented by L-O as defined in formula (I), and group R serves as the opposing endcap and will generally be a reactive or unreactive terminator group. Group Z, $R^1$ and $R^3$ will generally be as defined in formula (I). The copolymer itself will generally contain n segments derived from the poly(ethylene glycol) containing methacrylate of formula (II), intermittent with n, n+1, or n−1 segments derived from the tertiary amine methacrylate of formula (III), wherein each individual segment will have an independent variable length of $r^i$ and $m^i$, respectively, in the range between 1 to 5,000, wherein i represents each segment from 1 to n. The number of individual segments n in each copolymer may vary, preferably within a range where n is between 1 to 10,000.

The copolymers of the present invention provide novel characteristics heretofore unseen in the art. Unlike the polymers described by Nagasaki et al., supra, the copolymers of the present invention have completely different architectures and are comb-like with poly(ethylene glycol)

(PEG) side chains. The number density of these side chains are varied independently by changing the ratio of the monomers in the reaction mixture, while the comb-like architecture and variable-length PEG side chains are provided by propagating living chains using macromonomers. Since PEG is not present in the polymer backbone, and the length of the PEG chains can be varied by controlling the molecular weight of PEGMEM, the hydrophobic and hydrophilic regions of the polymer chains remain sufficiently segregated. Meanwhile, the poly(ethylene glycol) side chains prevent aggregation of the PDEAEM portions of the polymer. This will enable more cationic groups on the PDEAEM to be available for DNA binding for gene therapy applications.

The copolymers of the present invention exhibit pH-dependent release profiles for entrapped molecules by virtue of its added cationic moiety, and include a hydrophilic and a hydrophobic segment. In some instances, depending on the resultant structure of the copolymer, the copolymer may be capable of forming polymer micelles having a core derived from the tertiary amine methacrylate and a shell derived from the compound of formula (II). If such polymer micelles exist, they may be capable of carrying hydrophobic drugs and negatively chargeable compounds, such as anionic proteins and other anionic compounds. As a result, the present copolymers may find several applications in drug delivery and protein separation.

The present invention is more specifically explained with reference to the following non-limiting examples, which are intended to illustrate the invention and are not to be construed as to limit the scope of the invention.

EXAMPLES

Example 1

Preparation of PEGMEM-co-PDEAEM Copolymer

A random copolymer having the formula illustrated in FIG. 8 was prepared wherein Z was a diethyl amino group (NR$^6$R$^7$ with R$^6$ and R$^7$ being CH$^2$CH$^3$) and R$^1$ was CH$^3$. The copolymer (I-a) was prepared using N,N-(diethyl amino)ethyl methacrylate (DEAEM) (Sigma-Aldrich, St. Louis, Mo.), poly(ethylene glycol) methyl ether methacrylate (PEGMEM, $\overline{M}_n$=300) (Sigma-Aldrich), Potassium t-butoxide (KtBuO) (Sigma-Aldrich) as the initiator, and tetrahydrofuran (THF) (Sigma-Aldrich) as the solvent. Prior to polymerization, both the PEGMEM and the DEAEM monomer were stirred over calcium hydride for at least 24 hours. The dried DEAEM monomer was then distilled under vacuum immediately prior to use. The THF was also dried over sodium metal in the presence of benzophenone until a purple color was present. Once dried, the THF was then distilled under argon and used immediately. Potassium t-butoxide (KtBuO) was used under dry, inert atmosphere with no purification.

A stock solution of 0.8 17M KtBuO initiator in dry THF was prepared immediately prior to polymerization. An appropriate amount of the monomers (DEAEM, PEGMEM or a combination of the two) was transferred via air-tight syringe into a flame dried 100 ml round bottom flask with magnetic stir bar. All flasks used were flame dried for at least 2 minutes and cooled under flowing argon. Rubber septa sealed the flasks with copper ties to allow pressurization with argon. The monomer was then diluted to approximately 20% by mass with THF. 2.0 ml of the stock KtBuO solution was then injected into the solution using an air-tight syringe. The solution was then stirred at 400 RPM at room temperature for 20 minutes followed by 20 minutes at 50° C. The polymerization was terminated by injection of methanol into the reaction vessel. The resultant polymer was precipitated in −78° C. n-hexane and dried for at least 48 hours under vacuum at 50° C.

Example 2

NMR Characterization

NMR was used to determine the ratio of diethylaminoethyl methacrylate and poly(ethylene glycol) methyl ether methacrylate for the copolymers of Example 1, as well as residual monomers in any homopolymers and random copolymers. Hydrogen NMR was collected using a Varian VXR300 300 MHz spectrometer. The solvent used was chloroform, CDCl$_3$, for all samples.

Figure 3:
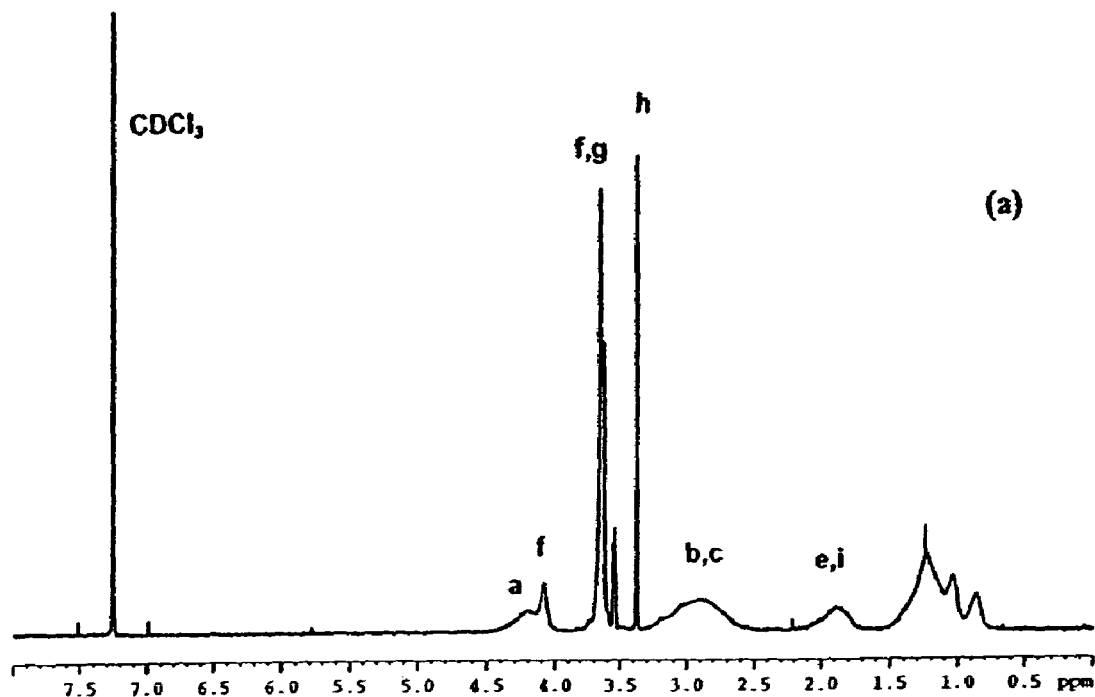
FIG. 3 is the $^1$H NMR spectra of a copolymer of the present invention having a PEGMEM:DEAEM ratio of 30:70.
Figure 3:
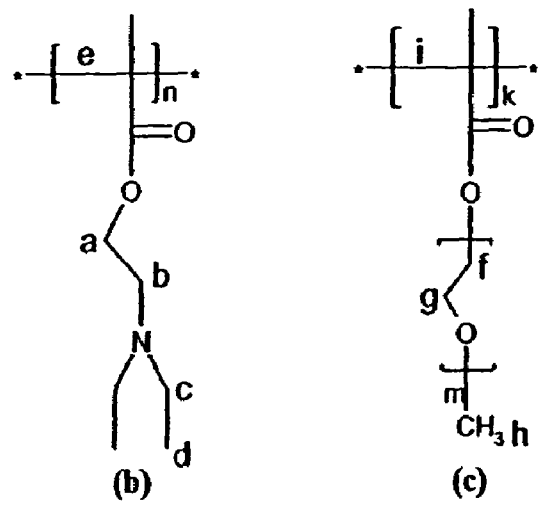

As shown in FIG. 3, both DEAEM and PEGMEM have a $^1$H NMR peak at approximately 4.3 ppm. The peak integral from the peak near 4.3 ppm is a combination of the first —CH$_2$— groups (α position) next to the methacrylate in both the monomers. However, PEGMEM contains the characteristic poly(ethylene glycol) peak at 3.6 ppm. The peak at 3.6 ppm for the PPEGMEM homopolymer (FIG. 3) was given a normalized integral of 1.000 and the peak around 4.3 ppm was integrated with respect to this peak. The ratio of the 3.6 ppm peak to the 4.3 ppm peak in the homopolymer was considered to be the ratio of the peaks from pure PEGMEM monomer in the absence of DEAEM monomer. The same procedure was carried out for the copolymers.

The peak area associated with the PEGMEM monomer was then subtracted from the combined peak area to find the area associated with the DEAEM monomer. Because both monomers have two protons associated with this peak, the ratio of the deconvoluted peak areas is the ratio of the monomers in the copolymer. The tabulated data for the target ratio and the ratio obtained from this characterization method are given in Table 1 below. The ratios reported in Table 1 are the ratios of PEGMEM:DEAEM in all cases.

Figure 4:
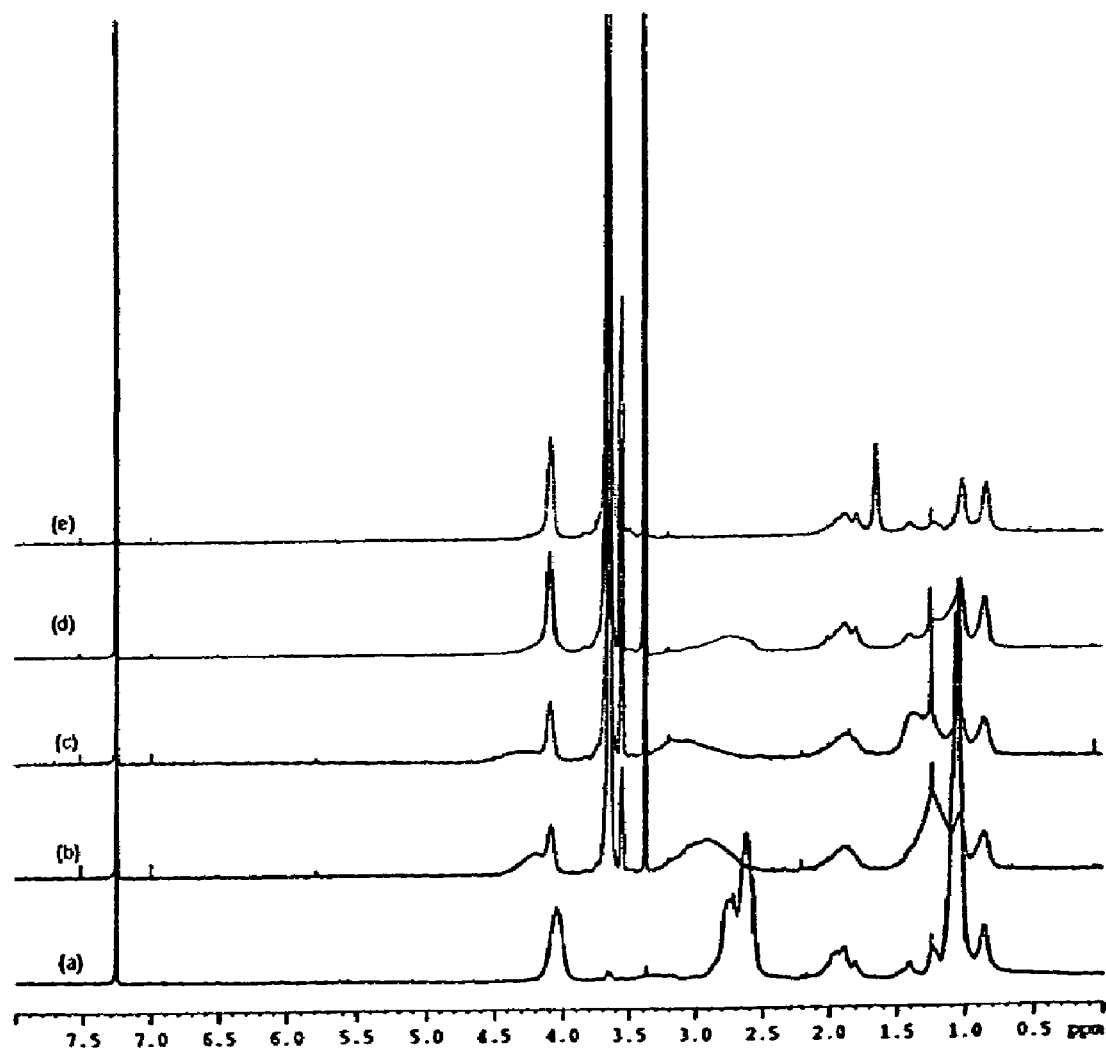
FIG. 4 is a stacked NMR spectra of a (a) PDEAEM homopolymer; (b) copolymer of the present invention having a PEGMEM:DEAEM ratio of 30:70; (c) a copolymer of the present invention having a PEGMEM:DEAEM ratio of 50:50; and a PPEGMEM homopolymer.

Because the deshielding of the protons on the a-position carbon relative to the ester in the two monomers is not exactly the same, there was a slight shift in the location of this peak using NMR. This is visualized in FIG. 4, where the copolymer and homopolymer NMR spectra are stacked to track the formation of the slightly bimodal peak in the copolymers and the shifted peaks of the homopolymers as well as the presence of the 3.6 ppm poly(ethylene glycol) peak in the PEGMEM containing polymers.

TABLE 1

Monomer ratios (PEGMEM:DEAEM) and molecular weights of the synthesized polymers

| ID | Target ratio | Ratio(NMR) | Target $\overline{M}_n$ | $\overline{M}_n$ (GPC) | $\overline{M}_n$ (LS) | PDI (GPC) | PDI (LS) |
|---|---|---|---|---|---|---|---|
| A | 100:0 | 100:0 | 10,000 | 8123 | 22600 | 1.19 | 1.15 |
| B | 50:50 | 43.1:56.9 | 10,000 | 7694 | 31200 | 1.18 | 1.25 |
| C | 30:70 | 28.6:71.4 | 10,000 | 6624 | 22100 | 1.18 | 1.13 |
| D | 0:100 | 0:100 | 10,000 | 6208 | 28300 | 1.18 | 1.24 |
| F | 100:0 | 100:0 | 20,000 | 7879 | 19600 | 1.22 | 1.21 |
| F | 70:30 | 74.9:25.1 | 20,000 | 8772 | 28700 | 1..22 | 1.13 |
| C | 50:50 | 49.1:50.9 | 20,000 | 8834 | 25100 | 1.20 | 1.15 |
| H | 30:70 | 31.5:68.5 | 20,000 | 8930 | 47200 | 1.22 | 1.14 |
| I | 0:100 | 0:100 | 20,000 | 7985 | 18200 | 1.21 | 1.20 |
| J | 100:0 | 100:0 | 20,000 | 8150 | 18400 | 1.21 | 1.20 |
| K | 70:30 | 62.6:37.4 | 20,000 | 9315 | 29600 | 1.18 | 1.15 |

TABLE 1-continued

Monomer ratios (PEGMEM:DEAEM) and molecular weights of the synthesized polymers

| ID | Target ratio | Ratio(NMR) | Target $\overline{M}_n$ | $\overline{M}_n$ (GPC) | $\overline{M}_n$ (LS) | PDI (GPC) | PDI (LS) |
|---|---|---|---|---|---|---|---|
| L | 50:50 | 53.3:46.7 | 20,000 | 9232 | 27800 | 1.24 | 1.17 |
| M | 30:70 | 33.4:66.6 | 20,000 | 9312 | 34600 | 1.27 | 1.13 |
| N | 0:100 | 0:100 | 20,000 | 8749 | 44500 | 1.32 | 1.12 |

Example 3

Gel Permeation Chromatography

Gel Permeation Chromatography (GPC) was used to obtain the average molecular weight of the polymer as well as the polydispersity index. THF was used as the mobile phase with a sample volume of 300 μl per sample injection. Four PLgel columns (Polymer Laboratories, Amherst, Mass.) heated to 40° C. achieved the appropriate separation. An Optilab inline refractometer (Wyatt Corp, Santa Barbara, Calif.) was used as the detector for retention times of the synthesized polymers relative to poly(methyl methacrylate) standards.

GPC results relative to poly(methyl methacrylate) standards were drastically lower than what was expected based on initiator concentration (Table 1). The polydispersity index (PDI), however, was on the order that is expected for anionic polymerization. In the absence of premature termination or slow initiation, both of which would cause a much broader molecular weight distribution, there is little explanation of a $\overline{M}_n$ much lower than the expected $\overline{M}_n$. Due to the high mass fraction of the polymer contained in the pendent groups of the PDEAEM homopolymer and PEGMEM/DEAEM copolymers, it was believed that a relative calibration to the linear polystyrene or poly(methyl methacrylate) could yield measured molecular weights much lower than their actual values. In order to verify the relative calibration measurements light scattering was used to obtain an absolute molecular weight measurement.

Example 4

Multi-Angle Laser Light Scattering

In order to obtain a more accurate assessment of the molecular weight and molecular weight distribution of the PEGMEM/DEAEM copolymers, inline light scattering data was obtained. A DAWN multi angle light scattering detector (Wyatt Corp., Santa Barbara, Calif.) was used to detect the scattered light at 90° from the incident beam. A dn/dc value of 0.049 mL/g was used for all copolymers and homopolymers. This value was determined by assuming 100% mass recovery with a known injection concentration and was consistent for the homopolymer and the various copolymers.

The values for $\overline{M}_n$ resulting from laser light scattering were much higher than the values obtained from relative RI measurements. The $\overline{M}_n$ values were also slightly higher than the target values, which could be due to the fact that the initiator was not titrated prior to each polymerization. If some of the potassium t-butoxide became inactive then the amount of active initiator would be lower, resulting in higher molecular weight values. If an exact $\overline{M}_n$ was desired, such a practice could be performed immediately prior to the polymerization.

Example 5

Differential Scanning Calorimetry

Differential scanning calorimetry was used to characterize the glass transition temperatures ($T_g$) of the PPEGMEM and PDEAEM homopolymers and the PEGMEM/DEAEM copolymers. Sub-ambient differential scanning calorimetry detection of the glass transition temperature was performed on a Pyrisi DSC (Perkin Elmer, Shelton, Conn.). Samples were cooled to −100° C. and held at this temperature for 15 minutes before beginning a temperature scan from −100° C. to 40° C. at a rate of 3° C./min under a nitrogen purge. The $T_g$ was determined using an inflection point method.

Because of the low $T_g$ for these polymers, a liquid nitrogen cooled DSC was used. The $T_g$ ranged from −49.1° C. for the PPEGMEM homopolymer to −19.8° C. for the PDEAEM homopolymer. The $T_g$ of the PDEAEM and PPEGMEM homopolymers and PEGMEM/DEAEM copolymers as a function of molar monomer ratio and mass monomer ratio are given in Table 2 below. Using the Gordon-Taylor equation for glass transition temperatures of random copolymers (Equation 1), a predicted value for the $T_g$ was calculated (Table 2). A value 0.15 was used for k, which was treated as a fitting factor. In Equation 1, $x_2$ is the mass fraction of the PEGMEM in the copolymer. It should be noted that the Gordon-Taylor equation uses the $T_g$ of the homopolymers as endpoints of the model. As a result, the accuracy can be no better than the accuracy of the homopolymer measurement.

$$T_g = \frac{Tg_1 + x_2(kTg_2 - Tg)}{1 + (k-1)x_2} \quad (1)$$

TABLE 2

Glass transition temperatures of DEAEM/PEGMEM copolymers and homopolymers

| ID | Ratio(molar) | Ratio (mass) | Tg (° C.) | Tg (predicted) |
|---|---|---|---|---|
| E | 100:0 | 100:0 | −49.1 | −49.1 |
| F | 74.9:25.1 | 64.8:35.2 | −47.4 | −46.9 |
| G | 49.1:50.9 | 37.3:62.7 | −44.7 | −43.2 |
| H | 31.5:68.5 | 22.1:77.9 | −37.4 | −38.9 |
| I | 0:100 | 0:100 | −19.8 | −19.8 |

Example 6

Solubility Testing

One of the characteristics of PDEAEM we had hoped to modify with the synthesis of a PPEGMEM/PDEAEM copolymer was the poor water solubility of PDEAEM under non-acidic conditions. The copolymers of PDEAEM and PPEGMEM were therefore tested for water solubility at three different pH levels (pH 6.5, pH 7.4, and pH 8.5) to assess the increased water solubility with the addition of the PEGMEM moiety.

A small sample of the polymer, approximately 30–40 mg, was placed on a clean glass slide that had been dried at 160° C. overnight. The sample was submerged in a phosphate or ammonium buffer at one of the pH levels and allowed to rotate radially for either 0.25, 0.5, 1 or 24 hours. At this point, the sample slide was removed from the buffer, rinsed quickly with deionized water to remove any residual buffer and placed face up in a vacuum oven for at least 24 hours.

After the samples were dried, they were weighed to determine the mass of original polymer remaining.

Figure 5:
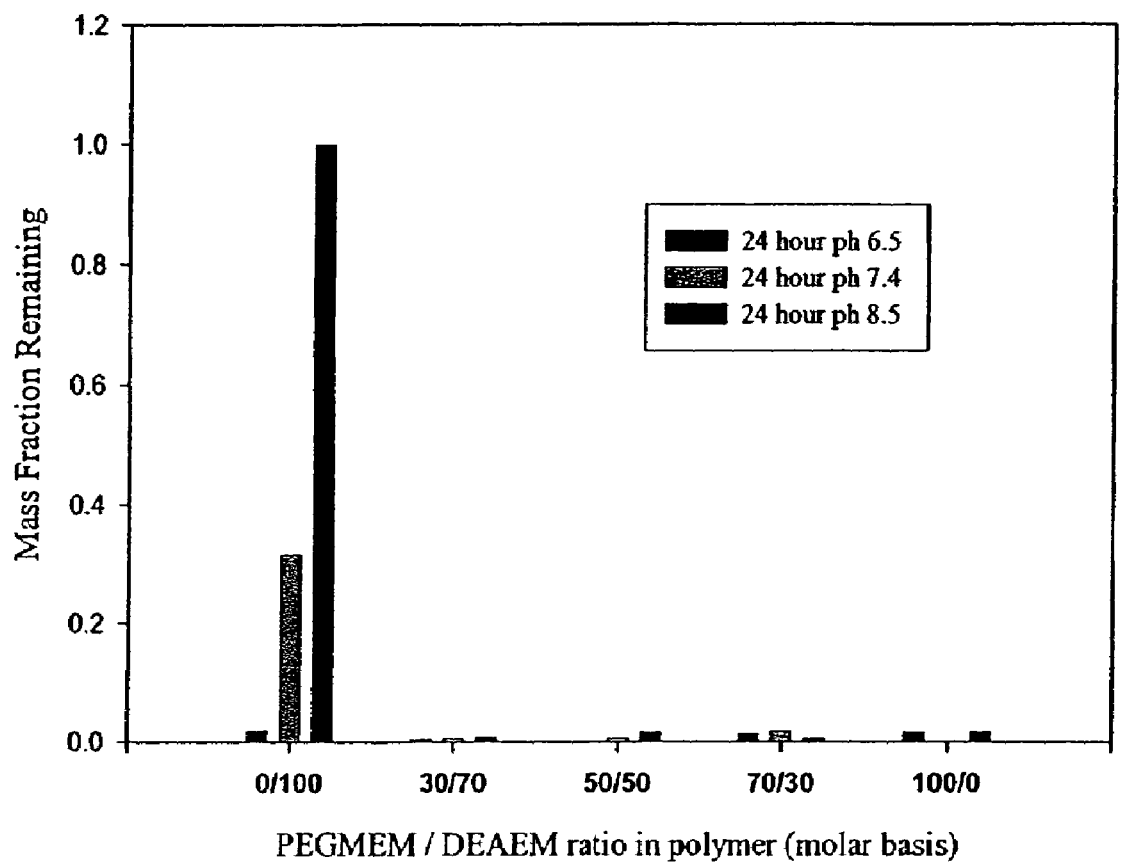
FIG. 5 is graph illustrating the solubility of PEGMEM homopolymers, DEAEM homopolymers and PEGMEM:DEAEM copolymers after 24 hours under three different pH conditions.

The results for the long term test are given in FIG. 5. The results indicate that the addition of as little as 30 mol % PEGMEM monomer in the copolymer results in full solubility under all of the conditions tested. The PDEAEM homopolymer, on the other hand, displayed no solubility under slightly basic conditions and only partial solubility under acidic conditions after 24 hours.

Figure 6:
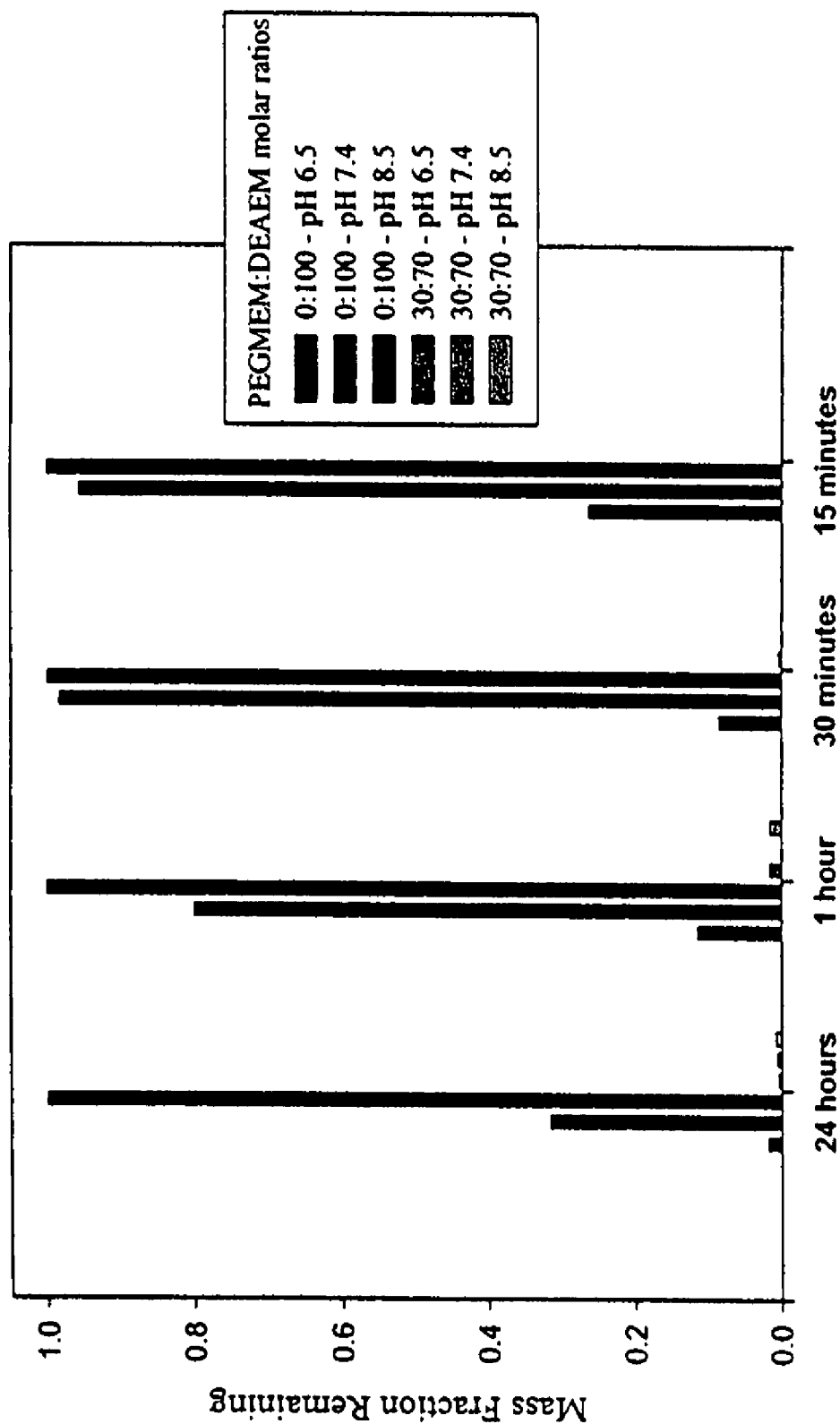
FIG. 6 is a graph illustrating the solubility of PDEAM homopolymers and copolymers of the present invention having a PEGMEM:DEAEM ratio of 30:70 at different pH conditions and over different time periods.

A closer comparison of the PDEAEM homopolymer and 30% PEGMEM/70% DEAEM copolymer under all pH conditions and at several different times is given in FIG. 6. This comparison further illustrates the water-soluble character of the copolymers relative to the PDEAEM homopolymer. The mass fraction of 30:70 PEGMEM:DEAEM copolymer remaining after 15 minutes was nearly zero, whereas after 24 hours 100% of the PDEAEM homopolymer remained for the basic conditions. Even at relatively neutral conditions (pH 7.4), the PDEAEM had 80% remaining after one hour and nearly 40% remaining after 24 hours. This compares to the copolymer that dissolved completely in under 15 minutes at this pH. This small amount of copolymer that appears at 24 hours is simply an artifact of the measurement accuracy of the tests. No copolymer was visible to the eye at any time at or after 15 minutes.

Example 7

Cloud Point Determination

The copolymer compositions of Example 1, as well as the homopolymers, were tested for pH-induced cloud point (CP) at room temperature. Cloud points were determined by dissolving a small amount of the polymer, approximately 35 mg, into a well stirred pH 6.5 buffer solution and adding 0.1 M NaOH until the solution became turbid. The tests were performed at room temperature and carried out in triplicate for samples that exhibited a pH induced cloud point.

Cloud point and water solubility tests verified that the addition of as little as 30% (molar basis) of the poly(ethylene glycol) moiety leads to solubility of the polymer in aqueous solutions over a wide range of pH levels. The homopolymer PDEAEM exhibited a CP at pH 7.7. None of the copolymers exhibited a cloud point for a pH as high as 12, further indicating that the PDEAEM homopolymer is not soluble in many aqueous solutions. The results, however, indicate that the copolymer formulations of the present invention are soluble under a wide range of pH conditions.

Example 8

Biocompatibity Testing

The cytotoxicity of the copolymers described in Example 1 was determined using an elution-type test. Approximately 30 mg of the polymers to be tested were dissolved in 100 ml of low-glucoses Dulbecco's modified eagle medium (DMEM, Sigma) with 10% fetal bovine serum (FBS, Sigma) 10 μg/ml insulin (Sigma), 10 units/ml penicillin/streptomycin (Sigma), and 100 μg/ml L-ascorbic acid (Sigma), and solution diluted to achieve the desired polymer concentration for all tests.

NIH/3T3 mouse fibroblasts were grown on a 25 mm² tissue culture treated polystyrene flask until they had achieved a cell density of approximately 150 cells/mm². The DMEM was removed from the flasks and replaced with one of the following: DMEM, DMEM with phenol (a known cytotoxic material), and DMEM with the copolymer to be tested. The phenol served as a positive control and the pure DMEM served as a negative control. The phenol and polymer controls were tested at concentrations set at 3 mg/L, 0.3 mg/L and 0.03 mg/L.

After 24 hours of incubation in a humidified incubator with 5% CO$_2$ at 37° C. the samples were removed and the media was replaced with Kamovsky's fixative (2.5% glutaraldehyde, 2.0% paraformaldehyde, 0.1M sodium cacodylate) for 12 hours. The fixative was then washed off the samples and replaced with crystal violet dye (CVD) in a 20% ethanol solution. After 6 hours, the CVD was removed and the cells were dehydrated with ethanol and the cell layer inspected for a cytotoxic response. Cell density, morphology and adherence were compared for the positive control, negative control and test samples.

Figure 7:
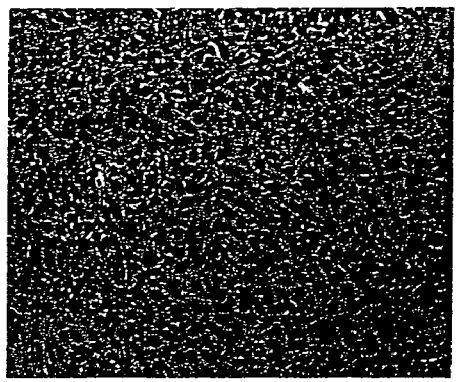
FIG. 7 are photographs of the results of the cytotoxity study at a concentration of 0.3 mg/L: (a) negative control (DMEM growth media); (b) positive control (Phenol); (c) PDEAEM hompolymer; and (d) 30:70 PEGMEM:DEAEM copolymer.
Figure 7:
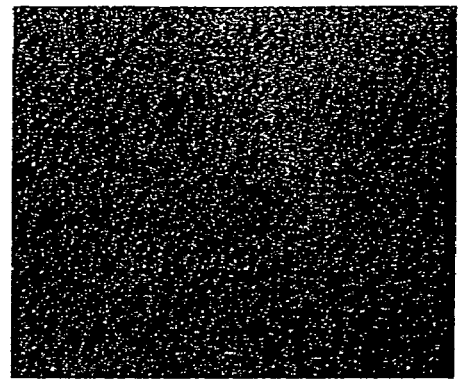
Figure 7:
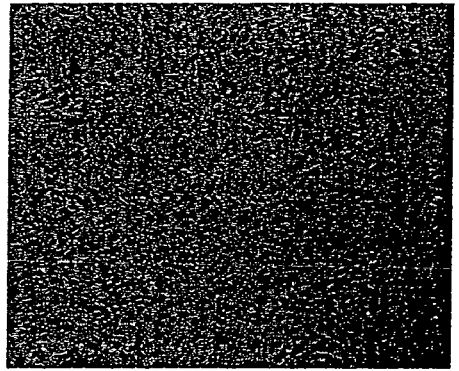

The results of the polymer samples tested were compared to the results of the same tests using the phenol control and the DMEM negative control. The phenol elicited the expected positive cytotoxic results (FIG. 7a). The cell bodies were small and the cells did not appear to confluent. This can be compared to the positive control (FIG. 7b) where the cell bodies were large and covered the entire surface. The PDEAEM homopolymer (FIG. 7c) elicited a response similar to the phenol, indicating that the PDEAEM material is, in fact, cytotoxic. The 30:70 PEGMEM:DEAEM copolymer (FIG. 7d) appeared to have the same effect on the density of the cell layer as the negative control. Although the test was subjective, it was apparent that the copolymer was much less cytotoxic than the DEAEM homopolymer. This contrast was seen at all the concentrations tested; 3 mg/L, 0.3 mg/L, and 0.03 mg/L.

We claim:

1. A water-soluble copolymer comprising a first monomer of

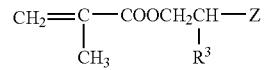

and a second monomer of

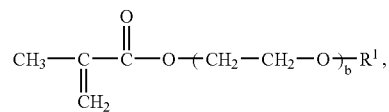

the copolymer is defined by formula (I):

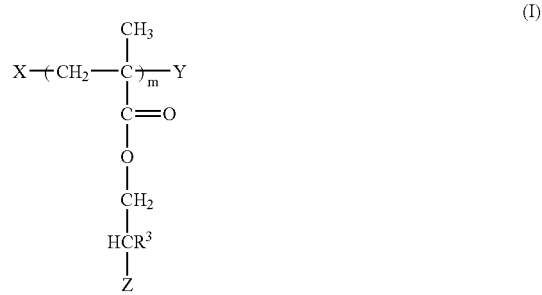

wherein X and Y are group (a), unless X is an endcap, in which case X is L-O and L is an organic group, or unless Y is an endcap, in which case Y is a reactive or unreactive terminator group:

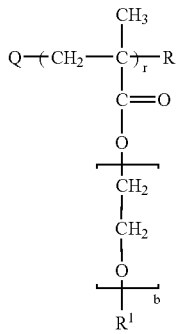
(a)

wherein r of group (a) for each group X and Y are independent values from each other, and wherein Q and R are a group represented by formula (I) in which m for each group Q and R are independent values from each other, but if R is an endcap, then R is a reactive or unreactive terminator group, or if Q is an endcap, then Q is L-O and L is an organic group;

- $R^1$ is protected or unprotected and is selected from the group consisting of an amine, a hydrogen, $CH_3$, a carboxylic acid, a linked biomolecule and a linked bioactive molecule;
- r is an integer in the range of 0 to 5,000;
- b is an integer in the range of 1 to 50;
- $R^3$ is a hydrogen or a $C_{1-6}$ alkyl group;
- Z is selected from the group consisting of $NR^6R^7$, $P(OR^8)_3$, $SR^9$, SH,

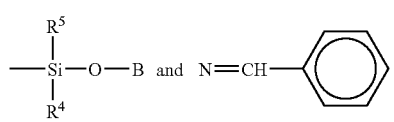

in which $R^6$, $R^7$, and $R^8$ are the same or different $C_{1-6}$ alkyl groups, $R^9$ is a tri($C_{1-6}$alkyl)silyl group, and B is a $C_{1-6}$ alkyl group; and m is a positive number of 1 to 5,000.

2. The copolymer of claim 1 wherein $R^3$ is a hydrogen.

3. The copolymer of claim 1 wherein $R^1$ is a linked biomolecule or bioactive molecule.

4. The copolymer of claim 1 wherein Z is $NR^6R^7$.

5. The copolymer of claim 1 wherein b is an integer in the range of 1 to 25.

6. The copolymer of claim 1 wherein b is an integer in the range of 1 to 6.

7. The copolymer of claim 1 having the formula:

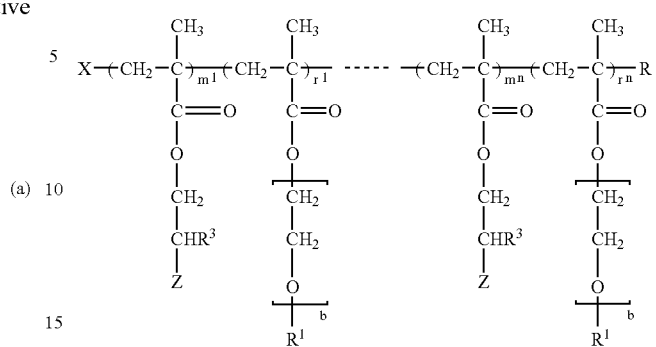

wherein X and R are endcaps;
- $m^1$ is a positive number of 1 to 5,000;
- $r^1$ is an integer in the range of 0 to 5,000;
- $m''$ is a positive number of 1 to 5,000; and
- $r''$ is an integer in the range of 0 to 5,000.

8. The copolymer of claim 7 wherein $R^1$ is $CH_3$ and Z is $NR^6R^7$ with $R^6$ and $R^7$ both being $CH_2CH_3$.

9. A composition comprising a pharmaceutical drug and a copolymer of claim 1 having the formula:

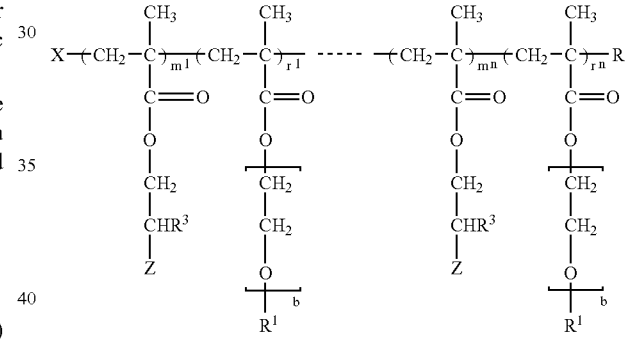

wherein X and R are endcaps;
- $m^1$ is a positive number of 1 to 5,000;
- $r^1$ is an integer in the range of 0 to 5,000;
- $m''$ is a positive number of 1 to 5,000; and
- $r''$ is an integer in the range of 0 to 5,000.

10. The composition of claim 9 wherein $R^1$ is $CH_3$ and Z is $NR^6R^7$ with $R^6$ and $R^7$ both being $CH_2CH_3$.

11. A water-soluble copolymer consisting essentially of a first monomer of

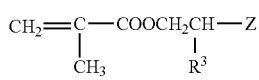

and a second monomer of

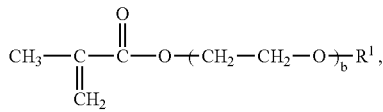

the copolymer is defined by formula (I):

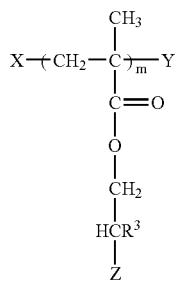

(I)

wherein X and Y are group (a), unless X is an endcap, in which case X is L-O and L is an organic group, or unless Y is an endcap, in which case Y is a reactive or unreactive terminator group:

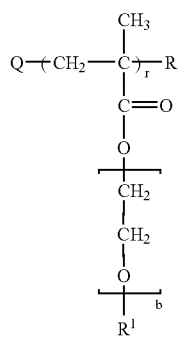

(a)

wherein r of group (a) for each group X and Y are independent values from each other, and wherein Q and R are a group represented by formula (I) in which m for each group Q and R are independent values from each other, but if R is an endcap, then R is a reactive or unreactive terminator group, or if Q is an endcap, then Q is L-O and L is an organic group;

$R^1$ is protected or unprotected and is selected from the group consisting of an amine, a hydrogen, $CH_3$, a carboxylic acid, a linked biomolecule and a linked bioactive molecule;

r is an integer in the range of 0 to 5,000;

b is an integer in the range of 1 to 50;

$R^3$ is a hydrogen or a $C_{1-6}$ alkyl group;

Z is selected from the group consisting of $NR^6R^7$, $P(OR^8)_3$, $SR^9$, SH,

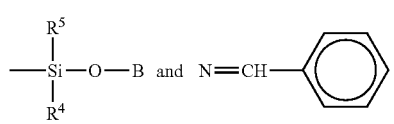

in which $R^6$, $R^7$, and $R^8$ are the same or different $C_{1-6}$ alkyl groups, $R^9$ is a tri($C_{1-6}$ alkyl)silyl group, and B is a $C_{1-6}$ alkyl group; and m is a positive number of 1 to 5,000.

12. The copolymer of claim 11 wherein $R^3$ is a hydrogen.

13. The copolymer of claim 11 wherein $R^1$ is a linked biomolecule or bioactive molecule.

14. The copolymer of claim 11 wherein Z is $NR^6R^7$.

15. The copolymer of claim 11 wherein b is an integer in the range of 1 to 25.

16. The copolymer of claim 11 wherein b is an integer in the range of 1 to 6.

17. The copolymer of claim 11 having the formula:

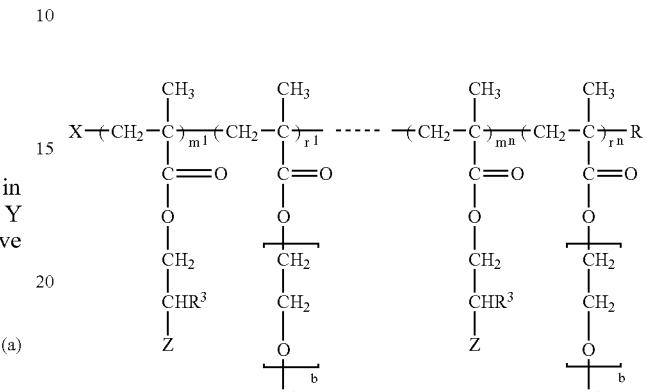

wherein X and R are endcaps;

$m^1$ is a positive number of 1 to 5,000;

$r^1$ is an integer in the range of 0 to 5,000;

$m''$ is a positive number of 1 to 5,000; and $r''$ is an integer in the range of 0 to 5,000.

18. The copolymer of claim 17 wherein $R^1$ is $CH_3$ and Z is $NR^6R^7$ with $R^6$ and $R^7$ both being $CH_2CH_3$.

19. A composition comprising a pharmaceutical drug and a copolymer of claim 11 having the formula:

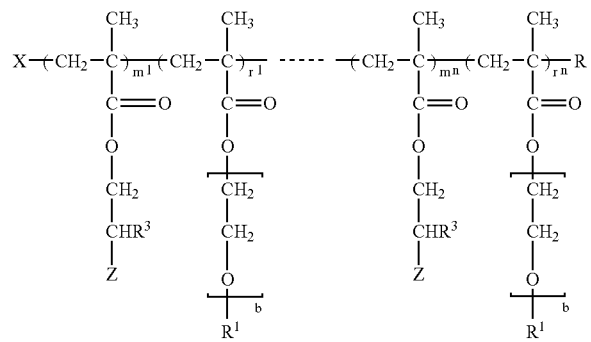

wherein X and R are endcaps;

$m^1$ is a positive number of 1 to 5,000;

$r^1$ is an integer in the range of 0 to 5,000;

$m''$ is a positive number of 1 to 5,000; and $r''$ is an integer in the range of 0 to 5,000.

20. The composition of claim 19 wherein $R^1$ is $CH_3$ and Z is $NR^6R^7$ with $R^6$ and $R^7$ both being $CH_2CH_3$.

* * * * *